(12) United States Patent
Lee et al.

(10) Patent No.: US 11,877,195 B2
(45) Date of Patent: Jan. 16, 2024

(54) METHOD AND APPARATUS FOR CELL RESELECTION IN WIRELESS COMMUNICATION SYSTEM

(71) Applicant: LG Electronics Inc., Seoul (KR)

(72) Inventors: Oanyong Lee, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 17/283,219

(22) PCT Filed: Dec. 20, 2019

(86) PCT No.: PCT/KR2019/018182
§ 371 (c)(1),
(2) Date: Apr. 6, 2021

(87) PCT Pub. No.: WO2020/138856
PCT Pub. Date: Jul. 2, 2020

(65) Prior Publication Data
US 2022/0150776 A1 May 12, 2022

(30) Foreign Application Priority Data
Dec. 26, 2018 (KR) .......... 10-2018-0169496

(51) Int. Cl.
*H04W 36/32* (2009.01)
*H04W 36/00* (2009.01)

(52) U.S. Cl.
CPC ....... *H04W 36/0072* (2013.01); *H04W 36/32* (2013.01)

(58) Field of Classification Search
CPC .. H04W 36/0072; H04W 36/32; H04W 48/20
See application file for complete search history.

(56) References Cited

U.S. PATENT DOCUMENTS

2008/0220784 A1* 9/2008 Somasundaram ............ H04W 36/00837
455/67.11
2010/0240367 A1 9/2010 Lee et al.
(Continued)

OTHER PUBLICATIONS

3rd Generation Partnership Project; Technical Specification Group Radio Access Network; NR; "User Equipment (UE) procedures in Idle mode and RRC Inactive state (Release 15)," 3GPP TS 38.304, V15.1.0, Sep. 2018, 27 pages.
(Continued)

*Primary Examiner* — Lester G Kincaid
*Assistant Examiner* — Dung L Lam
(74) *Attorney, Agent, or Firm* — Fish & Richardson P.C.

(57) ABSTRACT

The present disclosure relates to method and apparatus for cell reselection in wireless communications. According to an embodiment of the present disclosure, a method performed by a wireless device in a wireless communication system comprises performing a cell reselection to a cell at a first time point during a time duration; receiving, from the cell, information comprising a first time range and a weight related to the first time range; determining a mobility counter based on the weight related to the first time range, wherein a time length between the first time point and a second time point at which a previous cell reselection is performed during the time duration is within the first time range; and determining a mobility state of the wireless device based on the mobility counter.

14 Claims, 15 Drawing Sheets

(56) References Cited

U.S. PATENT DOCUMENTS

| | | | |
|---|---|---|---|
| 2014/0220979 A1 | 8/2014 | Song et al. | |
| 2014/0357273 A1* | 12/2014 | Teng | H04W 8/02 |
| | | | 455/436 |
| 2015/0072706 A1* | 3/2015 | Michaelsen | H04W 64/006 |
| | | | 455/456.1 |
| 2019/0387440 A1* | 12/2019 | Yiu | H04W 36/165 |
| 2022/0150776 A1* | 5/2022 | Lee | H04W 36/32 |

OTHER PUBLICATIONS

CATT, CMCC, "[C312] Mobility Evaluation Parameters Extension Considering Hsdn," R2-1811373, 3GPP TSG-RAN WG2 Meeting #103, Gothenburg, Sweden, Aug. 20-24, 2018, 5 pages.

* cited by examiner

METHOD AND APPARATUS FOR CELL RESELECTION IN WIRELESS COMMUNICATION SYSTEM

CROSS-REFERENCE TO RELATED APPLICATIONS

This application is a National Stage application under 35 U.S.C. § 371 of International Application No. PCT/KR2019/018182, filed on Dec. 20, 2019, which claims the benefit of Korean Patent Application No. 10-2018-0169496, filed on Dec. 26, 2018. The disclosures of the prior applications are incorporated by reference in their entirety.

BACKGROUND OF THE DISCLOSURE

Field of the Disclosure

The present disclosure relates to method and apparatus for cell reselection in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A wireless device such as a user equipment (UE) in a wireless communication system may have a mobility and may move along a various cells. If a current cell on which the wireless device camped cannot provide a proper service to the wireless device as the wireless device moves, the wireless device may have to perform a cell reselection to another cell.

SUMMARY OF THE DISCLOSURE

Technical Problem

An aspect of the present disclosure is to provide method and apparatus for cell reselection in a wireless communication system.

Another aspect of the present disclosure is to provide method and apparatus for a mobility state estimation (MSE) in a wireless communication system.

Another aspect of the present disclosure is to provide method and apparatus for performing a cell reselection based on MSE in a wireless communication system.

Technical Solution

According to an embodiment of the present disclosure, a method performed by a wireless device in a wireless communication system comprises performing a cell reselection to a cell at a first time point during a time duration; receiving, from the cell, information comprising a first time range and a weight related to the first time range; determining a mobility counter based on the weight related to the first time range, wherein a time length between the first time point and a second time point at which a previous cell reselection is performed during the time duration is within the first time range; and determining a mobility state of the wireless device based on the mobility counter.

According to an embodiment of the present disclosure, a wireless device in a wireless communication system comprises a memory; a transceiver; and at least one processor, operatively coupled to the memory and the transceiver. The at least one processor is configured to perform a cell reselection to a cell at a first time point during a time duration, control the transceiver to receive, from the cell, information comprising a first time range and a weight related to the first time range, determine a mobility counter based on the weight related to the first time range, wherein a time length between the first time point and a second time point at which a previous cell reselection is performed during the time duration is within the first time range, and determine a mobility state of the wireless device based on the mobility counter.

Advantageous Effect

The present disclosure can have various advantageous effects.

For example, by determining a mobility state of a wireless device based on a weighted mobility counter and performing a cell reselection based on the mobility state, the wireless device can prepare a next cell reselection quicker.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
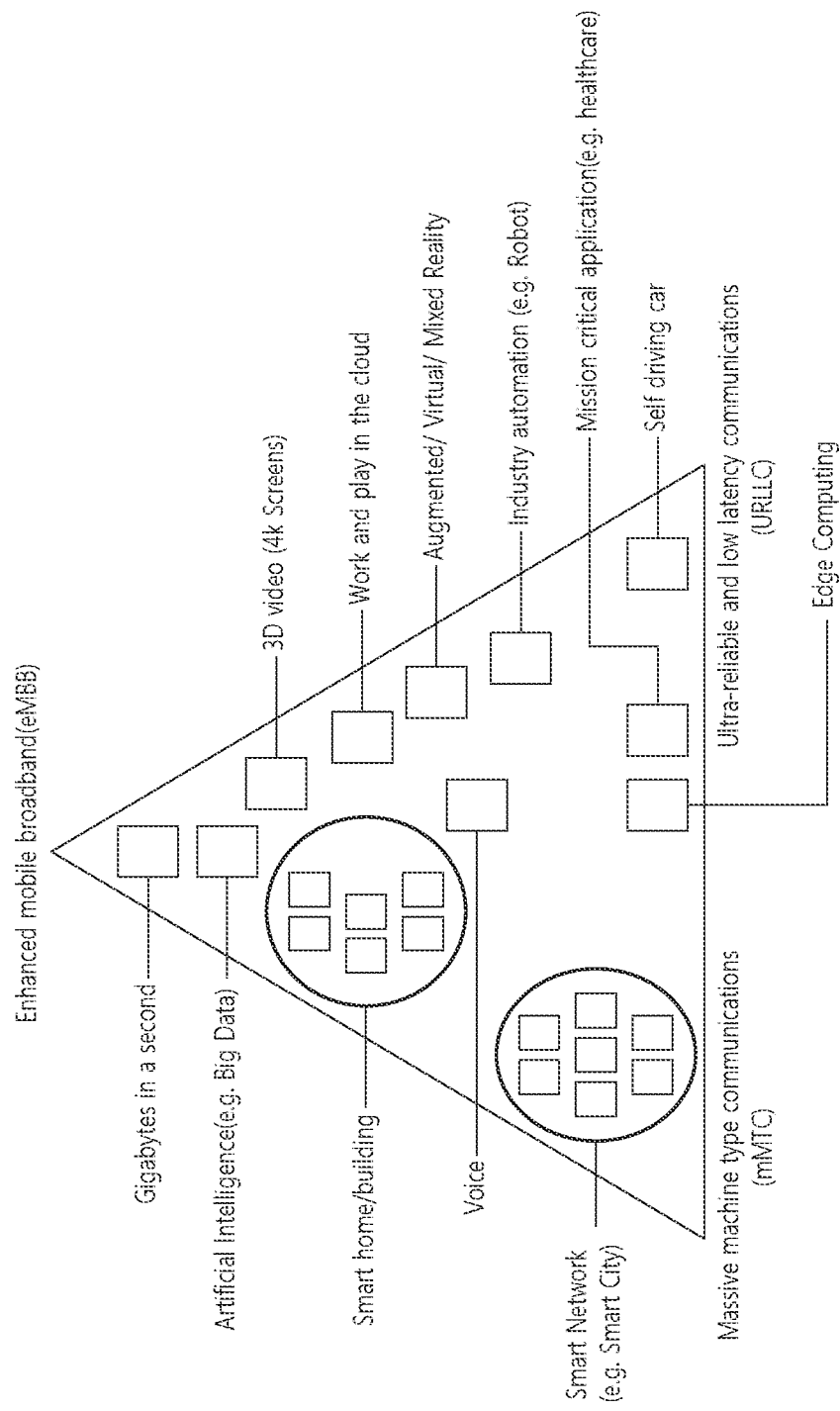
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The terms used throughout the present disclosure may be defined as follows:

'Mobility counter' refers to a counter which is a basis value for determining a mobility state of a wireless device such as UE. Mobility counter has a positive correlation with the number of cell reselections (i.e., mobility counter increases as the number of cell reselections increases). Mobility counter may be incremented per cell reselection by i)1 (=the number of cell reselections per cell reselection); or ii) weight related to a time range to which a time length between cell reselection times for a current cell and a previous cell belongs. The mobility counter may also be referred to as 'cell reselection counter'.

'Final mobility counter for a time duration' refers to a last determined mobility counter during the time duration. In other words, the final mobility counter may refer to a mobility counter that is determined latest during the time duration.

'Cell reselection time' refers to a time and/or a time point in which cell reselection is performed.

'Time range' refers to a range/time interval/time period from a lower bound of the time range to an upper bound of the time range (e.g., [0,3], [3,5], [5,infinte)). Time range A may be considered higher than time range B if one of the following condition is satisfied:

1) Lower bound of the time range A is higher than upper bound of the time range B;

2) Lower bound of the time range A is higher than lower bound of the time range B, and upper bound of the time range A is higher than upper bound of the time range B; and 3) Average or medium value of the time range A is higher than that of the time range B.

Similarly, time range A may be considered lower than time range B if one of the following condition is satisfied:

1) Upper bound of the time range A is lower than lower bound of the time range B;

2) Lower bound of the time range A is lower than lower bound of the time range B, and upper bound of the time range A is lower than upper bound of the time range B; and 3) Average or medium value of the time range A is lower than that of the time range B.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW)

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
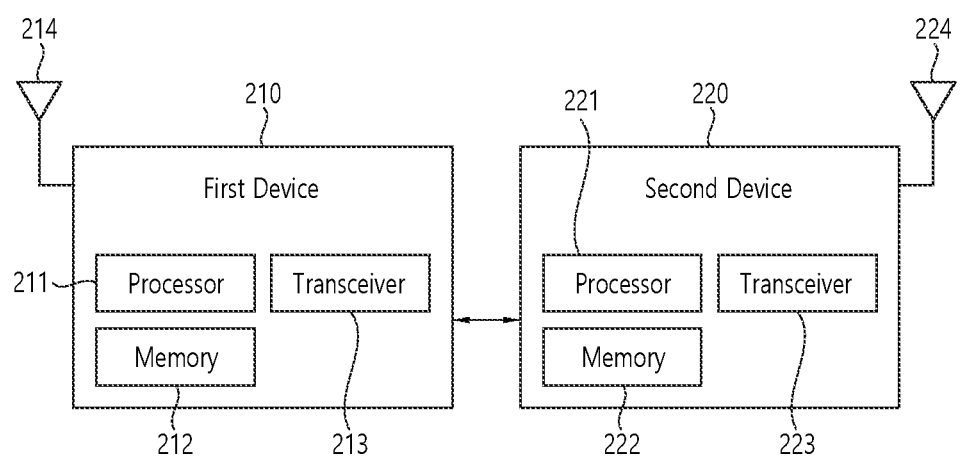
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
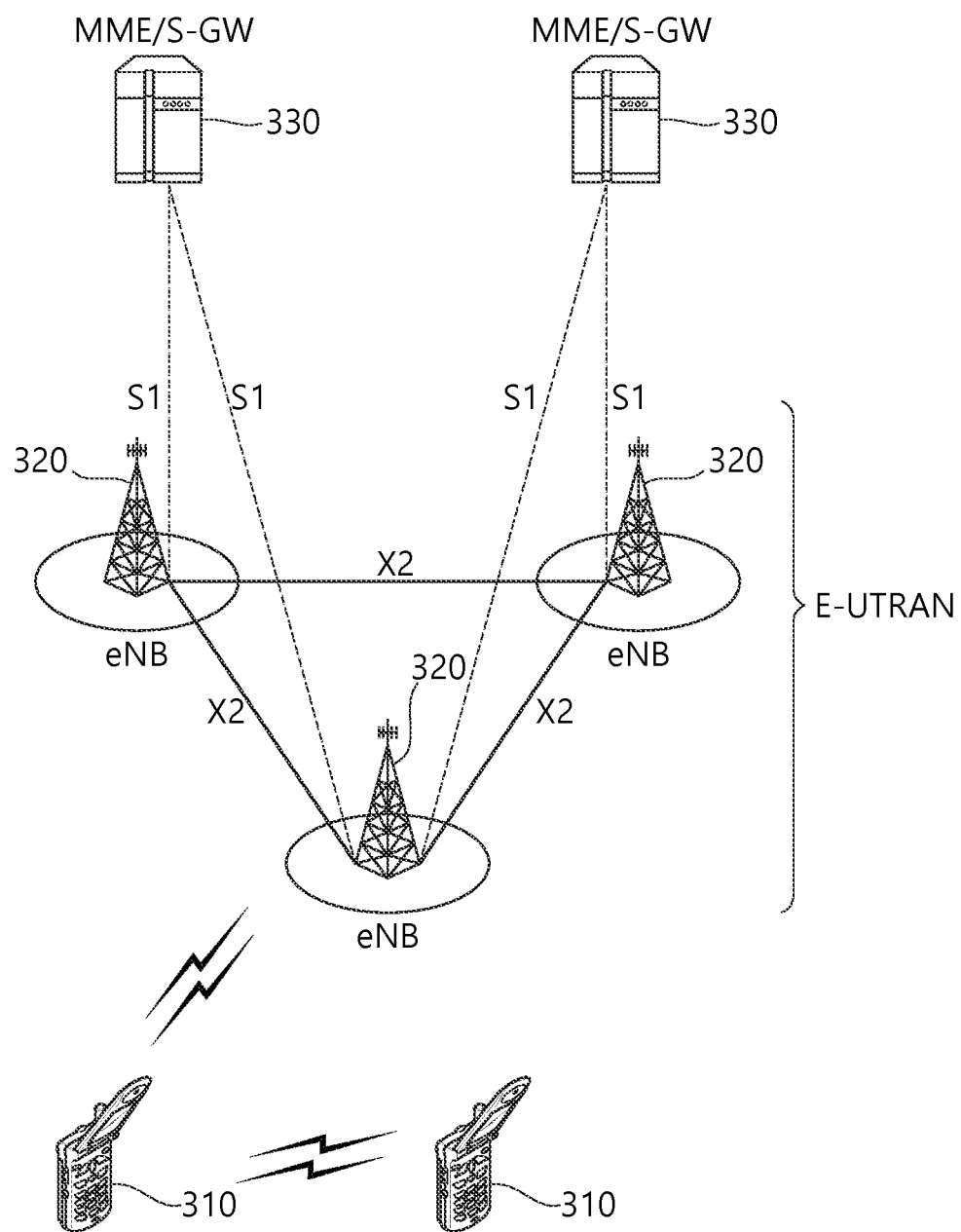
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 310. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
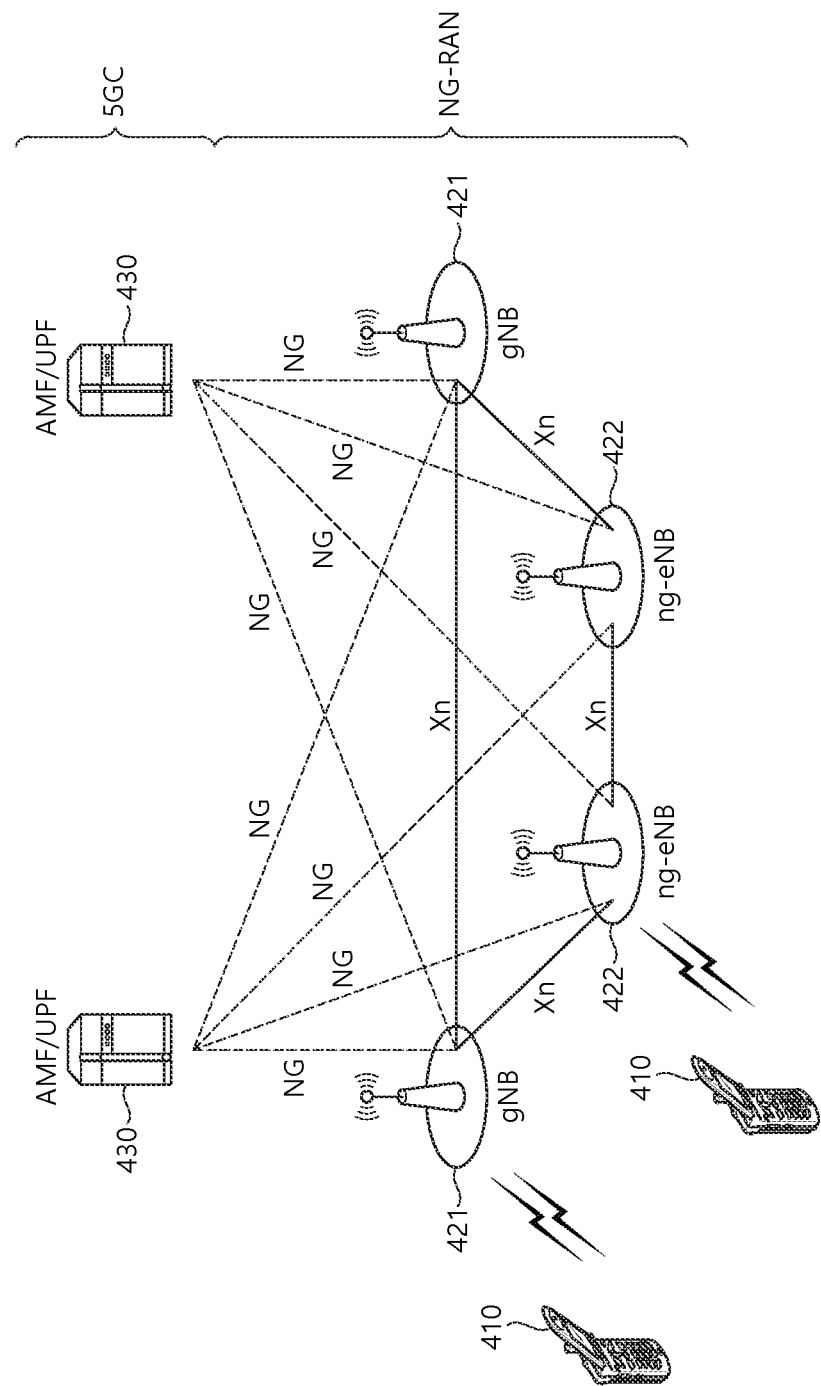
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
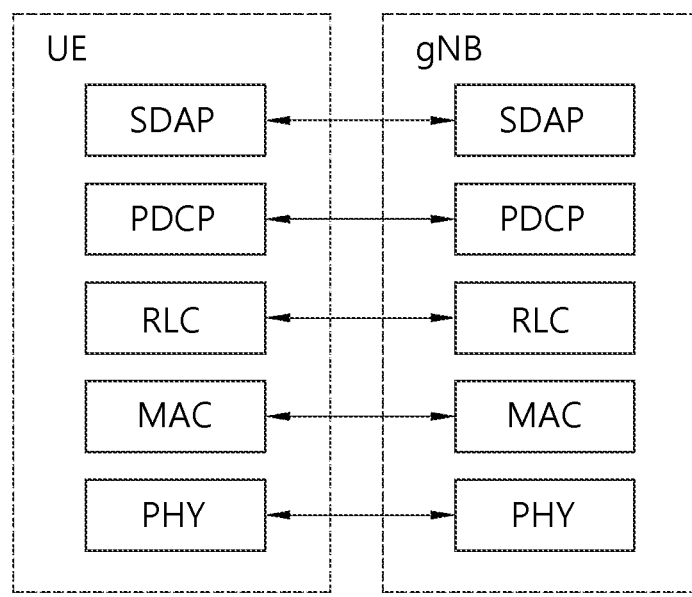
FIG. 5 shows a block diagram of a user plane protocol stack to which the technical features of the present disclosure can be applied.
Figure 6:
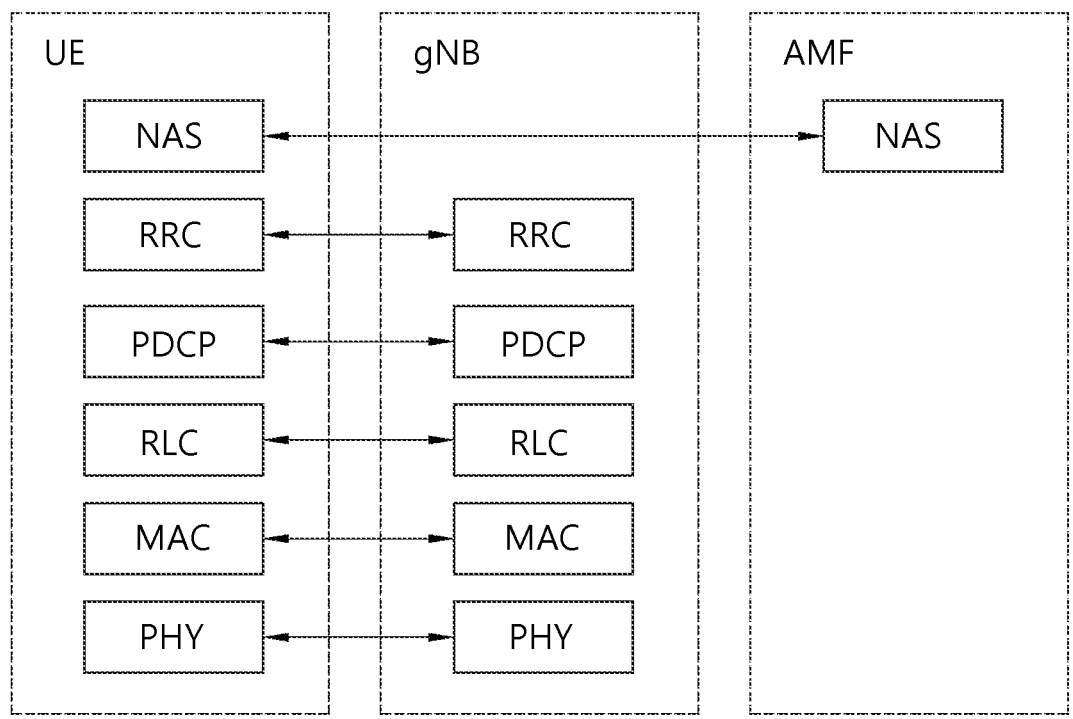
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell reselection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
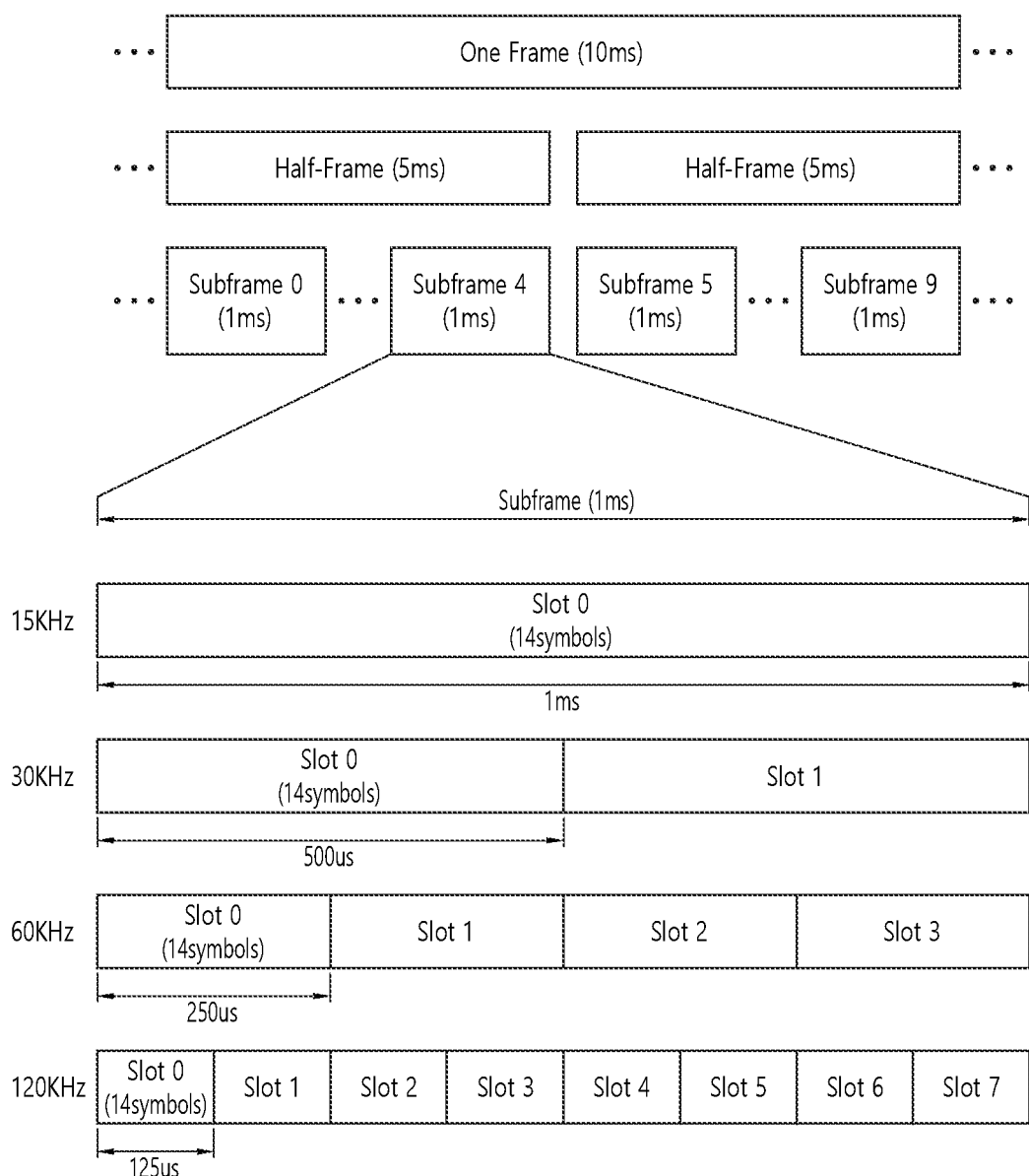
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2u*15$ kHz. The following table shows the number of OFDM symbols per slot, the number of slots per frame, and the number of slots per for the normal CP, according to the subcarrier spacing $\Delta f=2u*15$ kHz.

TABLE 3

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2u*15$ kHz.

TABLE 4

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter).

Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
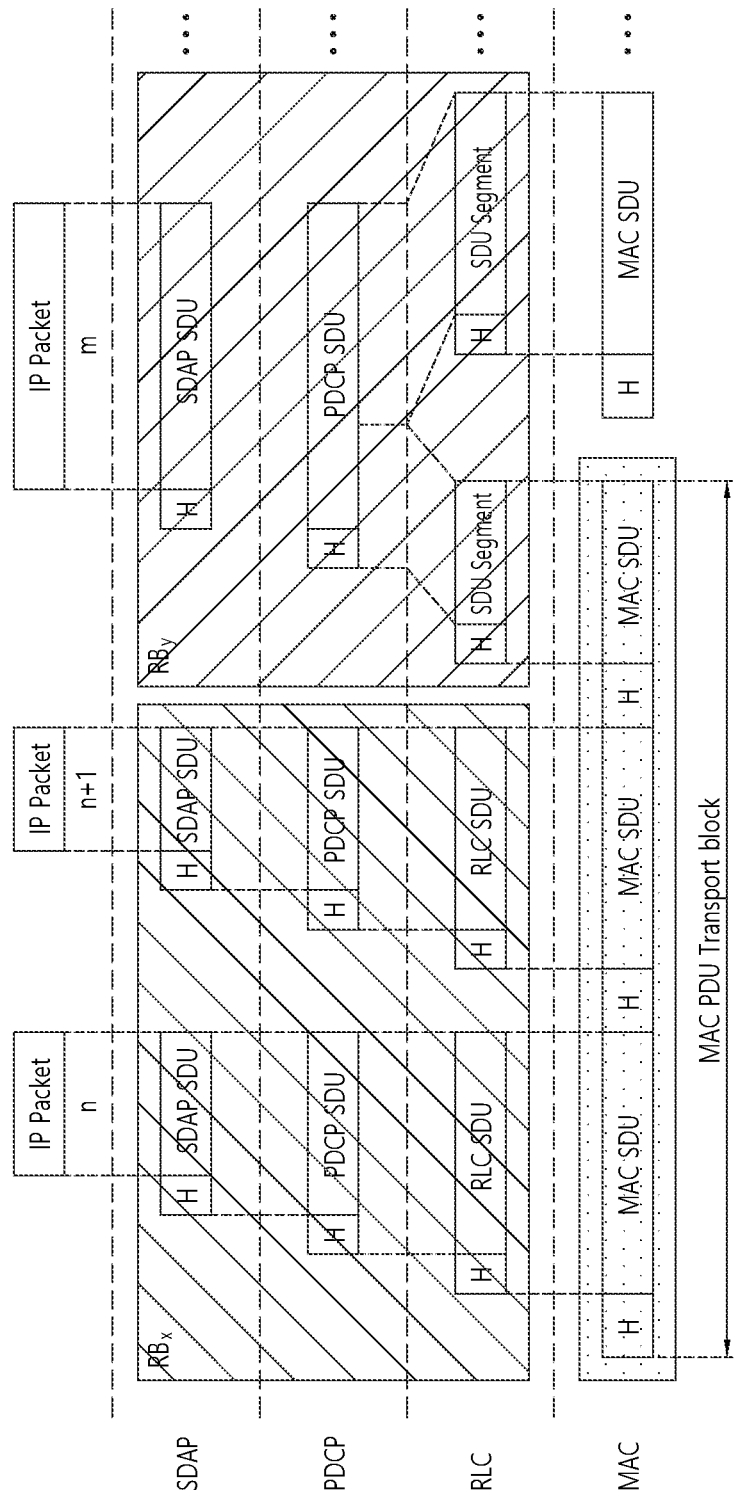
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Figure 9:
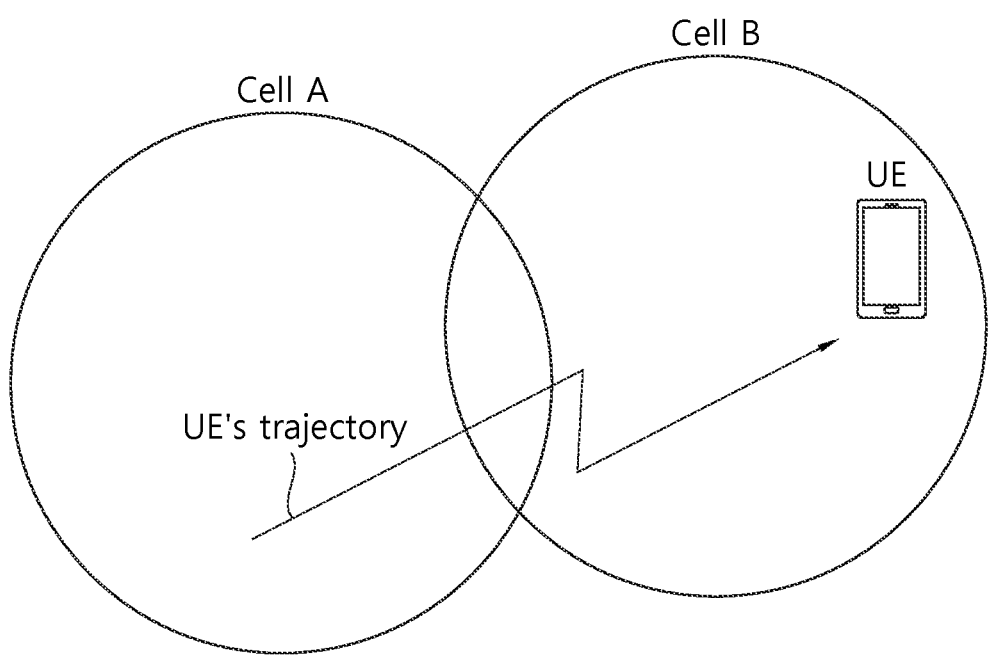
FIG. 9 shows an example of a cell selection and/or cell reselection situation to which technical features of the present disclosure can be applied.

FIG. 9 shows an example of a cell selection and/or cell reselection situation to which technical features of the present disclosure can be applied.

Referring to FIG. 9, a UE which may be currently served by cell A may move along a UE's trajectory as illustrated in FIG. 9 through the cell A and cell B. As the movement of the UE, signal quality for the cell A may become degraded and signal quality for the cell B may become improved. Therefore, the UE may perform a cell reselection to the cell B in order to be served by the cell B which may provide a better service to the UE than the cell A. The UE may perform a cell reselection and based on a result of the cell reselection (e.g., the number of cell reselections), a mobility state estimation (MSE) can be derived. The UE may determine a hysteresis value for cell reselection ranking criterion (i.e., $Q_{hyst}$) and/or a cell reselection timer value (i.e., $T_{reselectionRAT}$, $T_{reselectionEUTRA}$, $T_{reselectionNR}$) based on the MSE. Then, the UE may perform a next cell reselection to another cell based on the hysteresis value and/or the cell reselection timer value.

Hereinafter, cell selection process is described. Section 5.2.3 of 3GPP TS 38.304 V15.1.0 (2018-09) can be referred.

According to various embodiments, cell selection is performed by one of the following two procedures a) and b):

a) Initial cell selection (no prior knowledge of which RF channels are NR frequencies):

1. The UE shall scan all RF channels in the NR bands according to its capabilities to find a suitable cell.
2. On each frequency, the UE need only search for the strongest cell.
3. Once a suitable cell is found, this cell shall be selected.
  b) Cell selection by leveraging stored information:
1. This procedure requires stored information of frequencies and optionally also information on cell parameters from previously received measurement control information elements or from previously detected cells.
2. Once the UE has found a suitable cell, the UE shall select it.
3. If no suitable cell is found, the initial cell selection procedure in a) shall be started.

Priorities between different frequencies or RATs provided to the UE by system information or dedicated signalling are not used in the cell selection process.

According to various embodiments, the cell selection criterion S is fulfilled when Srxlev>0 and Squal>0, where the Srxlev and Sqaul satisfies the following equation 1 and equation 2:

$$Srxlev = Q_{rxlevmeas} - (Q_{rxlevmin} - Q_{rxlevminoffset}) - P_{compensation} - Qoffset_{temp} \quad \text{Equation 1}$$

$$Squal = Q_{qualmeas} - (Q_{qualmin} - Q_{qualminoffset}) - Qoffset_{temp} \quad \text{Equation 1}$$

The definition of parameters related to equation 1 and equation 2 is illustrated as the below table 5:

TABLE 5

| | |
|---|---|
| Srxlev | Cell selection RX level value (dB) |
| Squal | Cell selection quality value (dB) |
| $Qoffset_{temp}$ | Offset temporarily applied to a cell as specified in 3GPP TS 38.331 (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN 3GPP TS 23.122. |
| $Q_{qualminoffset}$ | Offset to the signalled $Q_{qualmin}$ taken into account in the Squal evaluation as a result of a periodic search for a higher priority PLMN while camped normally in a VPLMN 3GPP TS 23.122. |
| $P_{compensation}$ | If the UE supports the additionalPmax in the NS-PmaxList, if present, in SIB1, SIB2 and SIB4: max($P_{EMAX1}$ − $P_{PowerClass}$, 0) − (min($P_{EMAX2}$, $P_{PowerClass}$) − min($P_{EMAX1}$, $P_{PowerClass}$)) (dB); else: max($P_{EMAX1}$ − $P_{PowerClass}$, 0) (dB) |
| $P_{EMAX1}$, $P_{EMAX2}$ | Maximum TX power level of a UE may use when transmitting on the uplink in the cell (dBm) defined as PEMAX in 3GPP TS 38.101. $P_{EMAX1}$ and $P_{EMAX2}$ are obtained from the p-Max and NS-PmaxList respectively in SIB1, SIB2 and SIB4 as specified in 3GPP TS 38.331. |

TABLE 5-continued

| | |
|---|---|
| $P_{PowerClass}$ | Maximum RF output power of the UE (dBm) according to the UE power class as defined in 3GPP TS 38.101. |

The signalled values $Q_{rxlevminoffset}$ and $Q_{qualminoffset}$ are only applied when a cell is evaluated for cell selection as a result of a periodic search for a higher priority PLMN while camped normally in a VPLMN (3GPP TS 23.122). During this periodic search for higher priority PLMN, the UE may check the S criteria of a cell using parameter values stored from a different cell of this higher priority PLMN. Hereinafter, mobility state estimation is described. Section 5.2.4.3 of 3GPP TS 38.304 V15.1.0 (2018-09) can be referred.

The UE mobility state is determined if the parameters ($T_{CRmax}$, $N_{CR\_H}$, $N_{CR\_M}$ and $T_{CRmaxHyst}$) are broadcasted in system information for the serving cell.

The mobility state criteria may be a normal-mobility state criteria, if number of cell reselections during time period $T_{CRmax}$ is less than $N_{CR\_M}$.

The mobility state criteria may be a medium-mobility state criteria, if number of cell reselections during time period $T_{CRmax}$ is greater than or equal to $N_{CR\_M}$ but less than $N_{CR\_H}$.

The mobility state criteria may be a high-mobility state criteria, if number of cell reselections during time period $T_{CRmax}$ is greater than $N_{CR\_H}$.

The UE shall not consider consecutive reselections where a cell is reselected again right after one reselection for mobility state detection criteria.

The UE shall:
if the criteria for High-mobility state is detected, enter High-mobility state;
else if the criteria for Medium-mobility state is detected, enter Medium-mobility state;
else if criteria for either Medium- or High-mobility state is not detected during time period $T_{CRmaxHyst}$, enter Normal-mobility state.

If the UE is in High- or Medium-mobility state, the UE shall apply the speed dependent scaling rules.

UE shall apply the following scaling rules:
1) If neither Medium- nor High-mobility state is detected, no scaling is applied;
2) If High-mobility state is detected:
Add the sf-High of "Speed dependent ScalingFactor for $Q_{hyst}$" to $Q_{hyst}$ if broadcasted in system information;
For NR cells, multiply $Treselection_{NR}$ by the sf-High of "Speed dependent ScalingFactor for $Treselection_{NR}$" if broadcasted in system information;
For EUTRA cells, multiply $Treselection_{EUTRA}$ by the sf-High of "Speed dependent ScalingFactor for $Treselection_{EUTRA}$" if broadcasted in system information.
3) If Medium-mobility state is detected:
Add the sf-Medium of "Speed dependent ScalingFactor for $Q_{hyst}$" to $Q_{hyst}$ if broadcasted in system information;
For NR cells, multiply $Treselection_{NR}$ by the sf-Medium of "Speed dependent ScalingFactor for $Treselection_{NR}$" if broadcasted in system information;
For EUTRA cells, multiply $Treselection_{EUTRA}$ by the sf-Medium of "Speed dependent ScalingFactor for $Treselection_{EUTRA}$" if broadcasted in system information.

In case scaling is applied to any $Treselection_{RAT}$ parameter, the UE shall round up the result after all scalings to the nearest second.

Hereinafter, cell reselection criteria for NR Inter-frequency and inter-RAT cell is described. Section 5.2.4.5 of 3GPP TS 38.304 V15.1.0 (2018-09) can be referred.

If threshServingLowQ is broadcast in system information and more than 1 second has elapsed since the UE camped on the current serving cell, cell reselection to a cell on a higher priority NR frequency or inter-RAT frequency than the serving frequency shall be performed if:

A cell of a higher priority NR or EUTRAN RAT/frequency fulfils Squal>Thresh$_{X, HighQ}$ during a time interval Treselection$_{RAT}$ Otherwise, cell reselection to a cell on a higher priority NR frequency or inter-RAT frequency than the serving frequency shall be performed if:

A cell of a higher priority RAT/frequency fulfils Srxlev>Thresh$_{X, HighP}$ during a time interval Treselection$_{RAT}$; and More than 1 second has elapsed since the UE camped on the current serving cell.

Cell reselection to a cell on an equal priority NR frequency shall be based on ranking for intra-frequency cell reselection.

If threshServingLowQ is broadcast in system information and more than 1 second has elapsed since the UE camped on the current serving cell, cell reselection to a cell on a lower priority NR frequency or inter-RAT frequency than the serving frequency shall be performed if:

The serving cell fulfils Squal<Thresh$_{Serving, LowQ}$ and a cell of a lower priority NR or E-UTRAN RAT/frequency fulfils Squal>Thresh$_{X, LowQ}$ during a time interval Treselection$_{RAT}$.

Otherwise, cell reselection to a cell on a lower priority NR frequency or inter-RAT frequency than the serving frequency shall be performed if:

The serving cell fulfils Srxlev<Thresh$_{Serving, LowP}$ and a cell of a lower priority RAT/frequency fulfils Srxlev>Thresh$_{X, LowP}$ during a time interval Treselection$_{RAT}$; and More than 1 second has elapsed since the UE camped on the current serving cell.

Cell reselection to a higher priority RAT/frequency shall take precedence over a lower priority RAT/frequency if multiple cells of different priorities fulfil the cell reselection criteria.

If more than one cell meets the above criteria, the UE shall reselect a cell as follows:

If the highest-priority frequency is an NR frequency, a cell ranked as the best cell among the cells on the highest priority frequency(ies) meeting the criteria;

If the highest-priority frequency is from another RAT, a cell ranked as the best cell among the cells on the highest priority frequency(ies) meeting the criteria of that RAT.

Hereinafter, cell reselection ranking criterion is described. Section 5.2.4.6 of 3GPP TS 38.304 V15.1.0 (2018-09) can be referred.

The cell-ranking criterion R$_s$ for serving cell and R$_n$ for neighbouring cells is defined by the following equation 3 and equation 4:

$$R_s = Q_{meas,s} + Q_{hyst} - \text{Qoffset}_{temp} \quad \text{Equation 3)}$$

$$R_n = Q_{meas,n} - Q\text{offset} - \text{Qoffset}_{temp} \quad \text{Equation 4)}$$

The definition of parameters related to equation 3 and equation 4 is illustrated as the below table 6:

TABLE 6

| | |
|---|---|
| Q$_{meas}$ | RSRP measurement quantity used in cell reselections. |
| Qoffset | For intra-frequency: Equals to Qoffset$_{s, n}$, if Qoffset$_{s, n}$ is valid, otherwise this equals to zero. For inter-frequency: |

TABLE 6-continued

| | |
|---|---|
| | Equals to Qoffset$_{s, n}$ plus Qoffset$_{frequency}$, if Qoffset$_{s, n}$ is valid, otherwise this equals to Qoffset$_{frequency}$. |
| Qoffset$_{temp}$ | Offset temporarily applied to a cell as specified in 3GPP TS 38.331. |

The UE shall perform ranking of all cells that fulfil the cell selection criterion S. The cells shall be ranked according to the R criteria specified above by deriving Q$_{meas,n}$ and Q$_{meas,s}$ and calculating the R values using averaged RSRP results.

If rangeToBestCell is not configured, the UE shall perform cell reselection to the highest ranked cell. If this cell is found to be not-suitable, the UE shall behave according to subclause 5.2.4.4 of 3GPP TS38.304.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall behave according to subclause 5.2.4.4 of 3GPP TS38.304.

In all cases, the UE shall reselect the new cell, only if the following conditions are met:
the new cell is better ranked than the serving cell during a time interval Treselection$_{RAT}$;
more than 1 second has elapsed since the UE camped on the current serving cell.

Hereinafter, cell reselection parameters are described. Section 5.2.4.7 of 3GPP TS 38.304 V15.1.0 (2018-09) can be referred.

Cell reselection parameters are broadcast in system information and are read from the serving cell. The cell reselection parameters may comprise at least one of:

absThreshSS-BlocksConsolidation, which may specify minimum threshold of the beam which can be used for selection of the highest ranked cell, if rangeToBestCell is configured;

cellReselectionPriority, which may specify the absolute priority for NR frequency or E-UTRAN frequency;

cellReselectionSubPriority, which may specify the fractional priority value added to cellReselectionPriority for NR frequency or E-UTRAN frequency;

Qoffset$_{s,n}$, which may specify the offset between the two cells;

Qoffset$_{frequency}$, which may specify Frequency specific offset for equal priority NR frequencies;

Q$_{hyst}$, which may specify the hysteresis value for ranking criteria;

Qoffset$_{temp}$, which may specify the additional offset to be used for cell selection and reselection. It is temporarily used in case the RRC Connection Establishment fails on the cell as specified in 3GPP TS 38.331;

Q$_{qualmin}$, which may specify the minimum required quality level in the cell in dB;

Q$_{rxlevmin}$, which may specify the minimum required Rx level in the cell in dBm;

Q$_{rxlevminoffsetcell}$, which may specify the cell specific Rx level offset in dB to Qrxlevmin;

Q$_{qualminoffsetcell}$, which may specify the cell specific quality level offset in dB to Qqualmin;

rangeToBestCell, which may specify the R value range which the cells whose R value is within the range can be a candidate for the highest ranked cell;

Treselection$_{RAT}$, which may specify the cell reselection timer value. For each target NR frequency and for each RAT other than NR, a specific value for the cell reselection timer is defined, which is applicable when evaluating reselection within NR or towards other RAT (i.e. Treselection$_{RAT}$ for NR is Treselection$_{NR}$, for E-UTRAN Treselection$_{EUTRA}$). According to various embodiments, Treselection$_{RAT}$ may not be broadcast in system information but used in reselection rules by the UE for each RAT;

Treselection$_{NR}$, which may specify the cell reselection timer value Treselection$_{RAT}$ for NR. The parameter can be set per NR frequency 3GPP TS 38.331;

Treselection$_{EUTRA}$, which may specify the cell reselection timer value Treselection$_{RAT}$ for E-UTRAN;

Thresh$_{X, HighP}$, which may specify the Srxlev threshold (in dB) used by the UE when reselecting towards a higher priority RAT/frequency than the current serving frequency. Each frequency of NR and E-UTRAN might have a specific threshold;

Thresh$_{X, HighQ}$, which may specify the Squal threshold (in dB) used by the UE when reselecting towards a higher priority RAT/frequency than the current serving frequency. Each frequency of NR and E-UTRAN might have a specific threshold;

Thresh$_{X, LowP}$, which may specify the Srxlev threshold (in dB) used by the UE when reselecting towards a lower priority RAT/frequency than the current serving frequency. Each frequency of NR and E-UTRAN might have a specific threshold;

Thresh$_{X, LowQ}$, which may specify the Squal threshold (in dB) used by the UE when reselecting towards a lower priority RAT/frequency than the current serving frequency. Each frequency of NR and E-UTRAN might have a specific threshold;

Thresh$_{Serving, LowP}$, which may specify the Srxlev threshold (in dB) used by the UE on the serving cell when reselecting towards a lower priority RAT/frequency;

Thresh$_{Serving, LowQ}$, which may specify the Squal threshold (in dB) used by the UE on the serving cell when reselecting towards a lower priority RAT/frequency;

S$_{IntraSearchP}$, which may specify the Srxlev threshold (in dB) for intra-frequency measurements;

S$_{IntraSearchQ}$, which may specify the Squal threshold (in dB) for intra-frequency measurements;

S$_{nonIntraSearchP}$, which may specify the Srxlev threshold (in dB) for NR inter-frequency and inter-RAT measurements; or S$_{nonIntraSearchQ}$, which may specify the Squal threshold (in dB) for NR inter-frequency and inter-RAT measurements.

According to various embodiments, the cell reselection parameters may further comprise speed dependent reselection parameters. The speed dependent reselection parameters are broadcast in system information and are read from the serving cell. The speed dependent parameter may comprise at least one of:

T$_{CRmax}$, which may specify the duration for evaluating allowed amount of cell reselection(s);

N$_{CR\_M}$, which may specify the maximum number of cell reselections to enter Medium-mobility state;

N$_{CR\_H}$, which may specify the maximum number of cell reselections to enter High-mobility state;

T$_{CRmaxHyst}$, which may specify the additional time period before the UE can enter Normal-mobility state;

Speed dependent ScalingFactor for Qhyst, which may specify scaling factor for Qhyst in sf-High for High-mobility state and sf-Medium for Medium-mobility state;

Speed dependent ScalingFactor for Treselection$_{NR}$-, which may specify scaling factor for Treselection$_{NR}$ in sf-High for High-mobility state and sf-Medium for Medium-mobility state; or Speed dependent ScalingFactor for Treselection$_{EUTRA}$, which may specify scaling factor for Treselection$_{EUTRA}$ in sf-High for High-mobility state and sf-Medium for Medium-mobility state.

In a wireless communication system, a UE in RRC_IDLE or RRC_INACTIVE may perform cell reselection in order to camp on best cell. If number of cell reselections during time period and/or time duration T$_{CRmax}$ is greater than a threshold, the UE may enter medium/high-mobility state and adjust the cell reselection parameters (i.e. Treselection and/or Qhyst) in order to perform cell reselection to the neighbour cells quickly. This may be an example of a MSE mechanism used in LTE and/or NR for UE in RRC_IDLE or RRC_INACTIVE state.

However, the MSE mechanism may not reflect the UE's real mobility accurately. For example, the recent number of cell reselections may be used to determine the mobility state, but how frequently the cell reselections have occurred, in other words, the time interval and/or time length of the cell reselections is not regarded. For example, a UE taking 3 seconds to perform three cell reselections and the other UE taking 7 seconds to perform three cell reselections may have different mobility state, but the MSE mechanism may not differ them.

According to various embodiments, a UE may estimate a mobility state of itself by considering a time interval and/or time length between two sequent cell reselection events. In detail, the UE may increase the number of cell reselections by a weighted value depending on the time interval (i.e., increment a mobility counter by a weighted value depending on the time interval/time length). Accordingly, if the sequent cell reselections occur within a short time period, the UE increases the number of cell reselections (i.e., increment a mobility counter) faster than the case where the two sequent cell reselections occur within a longer time period.

Figure 10:
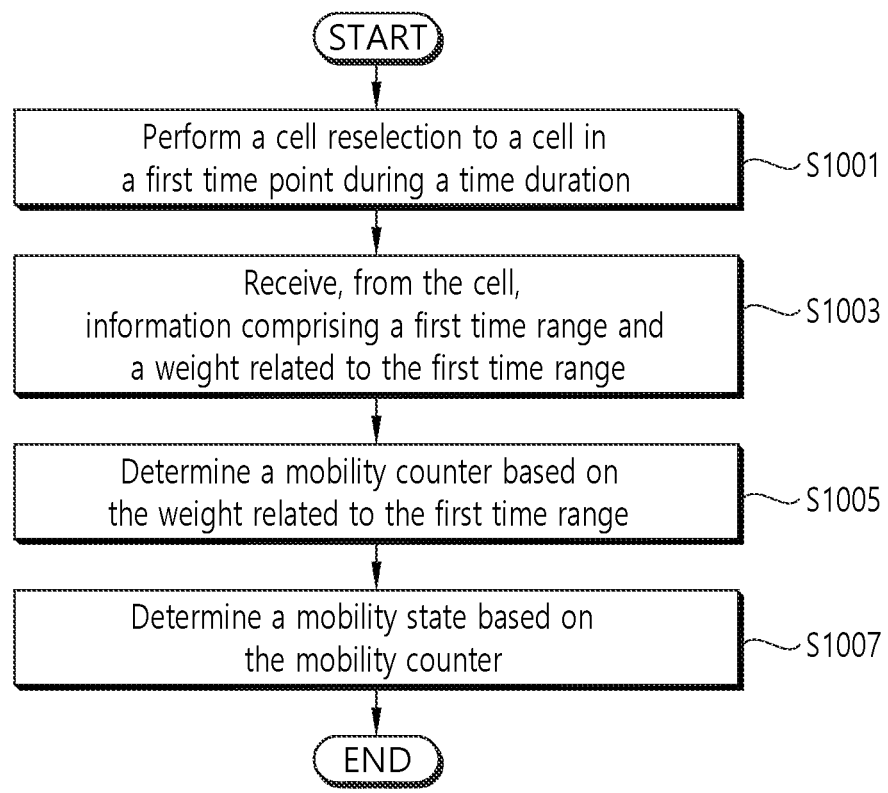
FIG. 10 shows an example of a method for determining a mobility state for cell reselection according to an embodiment of the present disclosure.

FIG. 10 shows an example of a method for determining a mobility state for cell reselection according to an embodiment of the present disclosure. The method may be performed by a wireless device, such as UE.

Referring to FIG. 10, in step S1001, the wireless device may perform a cell reselection to a cell at a first time point during a time duration. For example, the time duration may comprise a duration for evaluating allowed amount of the mobility counter and/or a T$_{CRmax}$. During the time duration, the wireless device camping on a serving cell may perform a cell reselection to a neighbour cell at the first time point according to a cell reselection criteria described above.

In step S1003, the wireless device may receive, from the cell, information comprising a first time range and a weight related to the first time range. The information may include system information (e.g., system information block type 2 (SIB2), SIB3, SIB 4 or SIB5 in NR, SIB3, SIB4, SIB5 or Sib 6 in LTE). For example, the wireless device may receive, from the reselected cell, system information comprising a plurality of time ranges and a plurality of weights each of which is related to each of the plurality of time ranges. The plurality of time ranges may comprise the first time range, and the plurality of weights may comprise the weight related to the first time range. According to various embodiments, higher time range may be related to lower weight. For example, the lowest weight (which may be 1 or no weight for example) may be related to the highest time range. For another example, the lowest weight (which may be 1 or no weight for example) may be related to none of the plurality of time ranges in the system information.

In step S1005, the wireless device may determine a mobility counter based on the weight related to the first time range. For example, the wireless device may determine a time length between the first time point and a second time point at which a previous cell reselection is performed during the time duration, determine the first time range to which the determined time length belongs (i.e., the time length between the first time point and the second time point is within the first time range) among the plurality of time ranges, and identify the weight related to the first time range. The wireless device may increment the mobility counter by the weight related to the first time range—that is, the wireless device may increment the mobility counter by an amount of the weight related to the first time range, instead of the number of cell reselections (which is 1).

In step S1007, the wireless device may determine a mobility state of the wireless device based on the mobility counter. The wireless device may determine a hysteresis value for cell reselection ranking criterion (i.e., $Q_{hyst}$) and/or a cell reselection timer value (i.e., $T_{reselectionRAT}$, $T_{reselectionEUTRA}$, $T_{reselectionNR}$) based on the mobility state of the wireless device, and perform a next cell reselection to another cell based on the hysteresis value and/or the cell reselection timer value.

According to various embodiments, for example, the mobility state may be determined to be a normal mobility state based on that a final mobility counter for the time duration is less that a first threshold (e.g., $N_{CR\_M}$). For another example, the mobility state may be determined to be a medium mobility state based on that the final mobility counter for the time duration is greater than or equal to the first threshold and less than a second threshold (e.g., $N-_{CR\_H}$). For another example, the mobility state may be determined to be a high mobility state based on that the final mobility counter is greater than or equal to the second threshold.

According to various embodiments, the wireless device may identify the hysteresis value and the cell reselection timer value based on that the mobility state of the wireless device is determined to be a normal mobility state. That is, the hysteresis value and the cell reselection timer value may be the same as the value received via the system information.

According to various embodiments, the wireless device may adjust (or, scale) the hysteresis value and the cell reselection timer value based on that the mobility state of the wireless device is determined to be a medium mobility state or a high mobility state. The adjusted (or, scaled) hysteresis value and adjusted cell reselection timer value may be different from the value received via the system information.

According to various embodiments, the wireless device may perform a next cell reselection to another cell at a third time point during the time duration. The wireless device may receive, from the other cell, information comprising a plurality of time ranges and a plurality of weights each of which is related to each of the plurality of time ranges. The wireless device may determine, among the plurality of time ranges, a second time range to which a time length between the third time point and the first time point belongs, and increment the mobility counter by a weight related to the second time range. The second time range may be different from the first time range, and the weight related to the second time range may be different from the weight related to the first time range.

According to various embodiments, for example, the second time range may be higher than the first time range, and the weight related to the second time range may be lower than the weight related to the first time range. For another example, the second time range may be lower than the first time range, and the weight related to the second time range may be higher than the weight related to the first time range.

According to various embodiments, the wireless device may perform next cell reselection to another cell at a third time point during the time duration. The wireless device may receive, from the other cell, information comprising a plurality of time ranges and a plurality of weights each of which is related to each of the plurality of time ranges. The wireless device may increment the mobility counter by 1 (or, the lowest weight) based on a determination that a time interval between the third time point and the first time point belongs to none of the plurality of time ranges.

Figure 11:
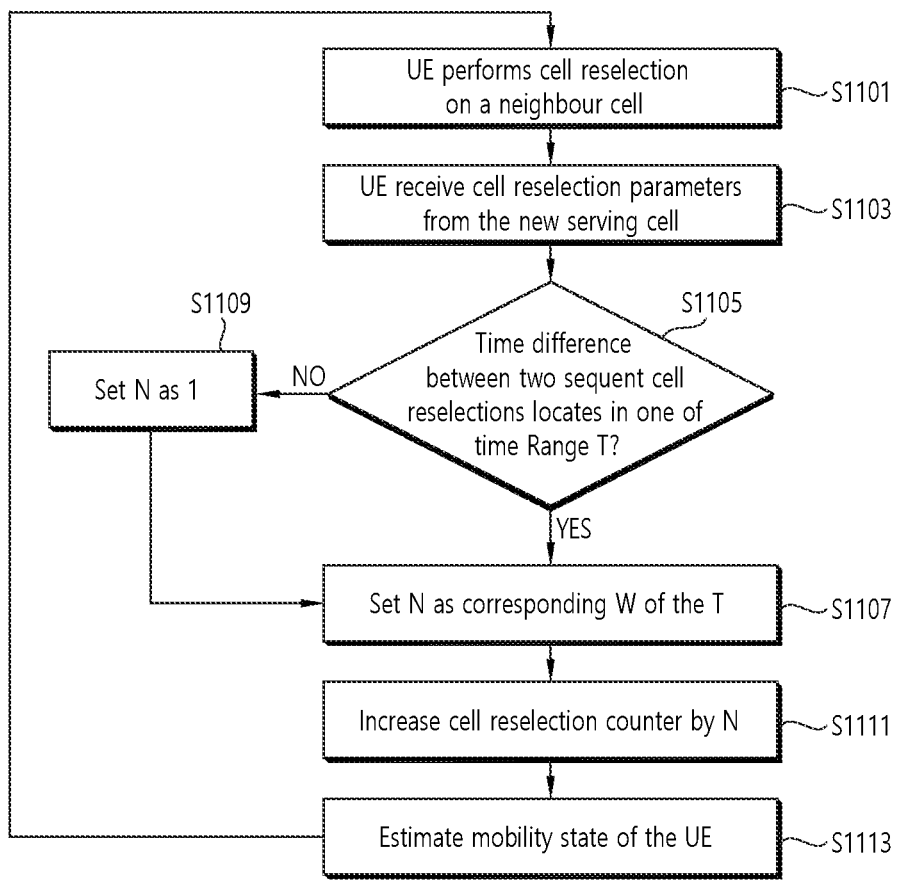
FIG. 11 shows an example of a method for a mobility state estimation according to an embodiment of the present disclosure.

FIG. 11 shows an example of a method for a mobility state estimation according to an embodiment of the present disclosure. The method may be performed by a wireless device, such as UE. For simplicity, it is illustrated in FIG. 11 that the steps are performed by UE—however, the steps can also be performed by the wireless device including the UE.

Referring to FIG. 11, in step S1101, the UE may perform a cell reselection on a neighbour cell. According to the cell reselection, the neighbour cell may become a new serving cell for the UE.

In step S1103, the UE may receive cell reselection parameters form the new serving cell and/or network. If the UE is in RRC_IDLE or RRC_INACTIVE, the cell reselection parameters are provided via broadcast system information, (e.g., SIB2, 3, 4, 5 in NR, SIB3, 4, 5, 6 in LTE). Each cell may broadcast different SIB. If the UE is in RRC_CONNECTED, the cell reselection parameters can be provided via dedicated signalling.

The cell reselection parameters may include:
  At least one time range T. For a time range T, the UE can receive a lower bound and an upper bound for determination of the time range T via system information and/or dedicated signalling.
  At least one cell reselection counter weight W. The cell reselection counter weight W may be given positive integer value.

If the UE receives multiple Time Range T, the UE may receive a cell reselection counter weight W mapped to each Time Range T. For example, the UE may receive W1 for time range T1 while the UE may receive W2 for Time Range T2. W1 and W2 may be different. If Time Range T1 is lower than Time Range T2 (e.g., if the upper bound of T1 is smaller than the lower bound of T2), W1 mapped to T1 may be bigger than W2 mapped to T2. The Time Range of T1 and T2 may or may not overlap in time domain.

In step S1105, the UE may determine whether a time difference between two sequent cell reselections locates in one of time range T. The UE may calculate a time length or time interval between time points of the last/previous cell reselection and the preceding cell reselection of the last cell reselection. That is, the UE may calculate the time length or the time interval between last two cell reselections. Then, the UE may determine whether a time difference between two sequent cell reselections locates in one of time range T.

The UE may manage a counter (i.e., cell reselection counter and/or mobility counter) associated with counting the recent number of cell reselections. The counter is used to count the effective number of cell reselections (i.e., the number of cell reselections with weight applied/not applied according to a time length between two sequent cell reselections) performed within a certain time period. The time period may be recent time duration from the current time point to the past, and the time duration may be given one of cell reselection parameters (e.g., $T_{CRmax}$).

If the time difference between two sequent cell reselections locates in one of time range T, the UE may perform step S1107. However, if the time difference between two sequent cell reselections does not locate in one of time range T (i.e., the time difference between two sequent cell reselections locates in none of the time ranges), the UE may perform step S1109.

In step S1107, the UE may set N as corresponding W of the T. That is, if the calculated time length or time interval is within a particular time range T, the UE may set value N as value W mapped to the particular time range T.

In step S1109, the UE may set N as 1. That is, if the calculated time length or time interval is not within a particular time range T (i.e., the calculated time length or time interval lies within none of the time ranges provided by the new serving cell via system information and/or dedicated signalling), the UE may set value N as 1.

In step S1111, the UE may increase (or, increment) cell reselection counter (or, mobility counter) by N. For example, the UE may increase or increment the mobility counter by N when the UE camps on the new serving cell as a result of the cell reselection procedure.

In step S1113, the UE may estimate mobility state of the UE. For example, the UE may estimate that the mobility state of the UE is normal mobility state if a final mobility counter for the time duration is less that a first threshold (e.g., $N_{CR\_M}$). For another example, the UE may estimate that the mobility state of the UE is a medium mobility state if the final mobility counter for the time duration is greater than or equal to the first threshold and less than a second threshold (e.g., $N-_{CR\_H}$). For another example, the UE may estimate that the mobility state of the UE is a high mobility state if the final mobility counter is greater than or equal to the second threshold.

According to various embodiments of the present disclosure, a UE accelerating its speed can quickly increase the cell reselection counter by applying weights so that the UE can enter medium/high-mobility state earlier than the case of counting the number of cell reselections without applying weights.

Figure 12:
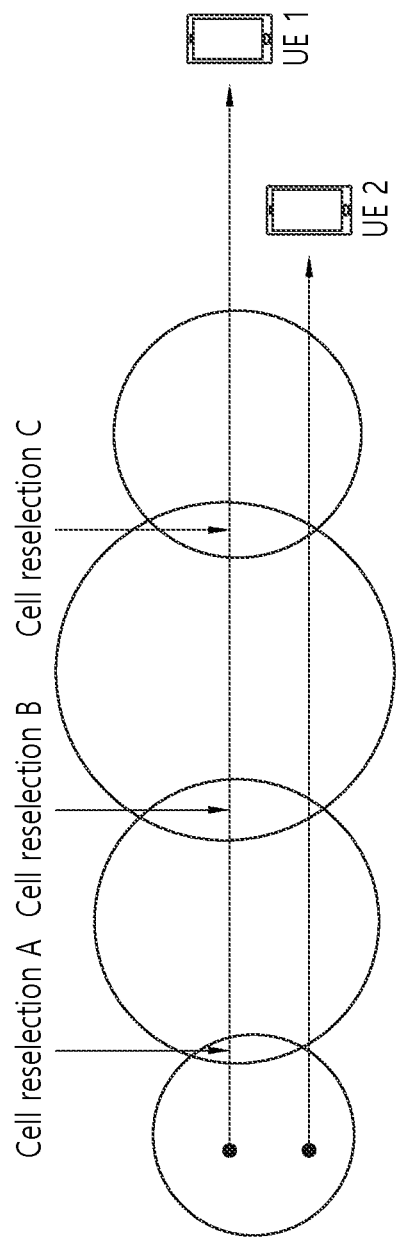
FIG. 12 shows an example of a method for determining a cell reselection counter according to an embodiment of the present disclosure.

According to various embodiments of the present disclosure, the network or cell may set value of cell reselection counter weight W mapped to each time range T as follows:
- If the cell expects that the UE reselecting on the cell may have higher speed, the cell may increase the value of W.
- If the cell considers that coverage of the cell is smaller than that of the neighbor cells, the cell may increase the value of W FIG. 12 shows an example of a method for determining a cell reselection counter according to an embodiment of the present disclosure.

Referring to FIG. 12, it is assumed that two stationary UEs start of in a cell 1210 and moves through four cells (i.e., cell 1210, 1220, 1230 and 1240) accelerating their speed. Three cell reselections may occur for each of the UE 1 and the UE 2 in this case (cell reselection A: cell reselection on cell 1220 from cell 1210; cell reselection B: cell reselection on cell 1230 from cell 1220; and cell reselection C: cell reselection on cell 1240 from cell 1230). Further, it is assumed that the UE 1 is accelerating more rapidly so the time lengths or time intervals between the sequent cell reselections by the UE 1 are shorter than those by the UE 2, as illustrated in table 7 below:

TABLE 7

|  | Time interval between cell reselection A and B | Time interval between cell reselection B and C |
| --- | --- | --- |
| UE 1 | 2 sec | 1 sec |
| UE 2 | 4 sec | 3 sec |

Time ranges T1, T2 and weights W1, W2 which are related to T1, T2, respectively, are assumed to be: Time range T1: 0~3 sec (i.e., [0, 3]), W1 equals 2; and Time range T2: greater than 3 sec (i.e., [3,infinite)), W2 equals 1.

Also, $T_{CRmax}$ (i.e., time duration that each UE increments a cell reselection counter for each cell reselection without resetting the cell reselection counter) is assumed to be 8 sec.

To perform cell reselection three times, UE 1 takes only 3 seconds in total, whereas UE 2 takes 7 seconds. If the cell reselection counter is incremented by the number of cell reselections, even though the UE 1 is more than two times faster than UE 2, they have same number of cell reselections (i.e., 3) and the cell reselection counter for the UE 1 is the same as that for the UE 2. Therefore, the can have the same mobility state. However, if the cell reselection counter is incremented by applying weights according to a time length or time interval between sequent cell reselections, the cell reselection counter for the UE 1 may be different from that for the UE 2. For example, cell reselection counter for the UE 1 may be incremented by weight value W1 for cell reselections B and C, and cell reselection counter for the UE 2 may be incremented by weight value W1 for cell reselection C because the time length or time interval with each preceding cell reselection locates in time range T1. After performing the cell reselection C, the cell reselection counter of the UE 1 is 5 (i.e., the cell reselection counter of UE 1 is incremented by W1=2 for cell reselections B and C, and by W2=1 for cell reselection A) and the cell reselection counter of the UE 2 is 4 (i.e., the cell reselection counter of the UE 2 is incremented by W2=1 for cell reselections A and B, and by W1=2 for cell reselection C). As a result, the UE 1 can enter medium/high-mobility state earlier than UE 2 so that the UE 1 can prepare the next cell reselection quicker.

Figure 13:
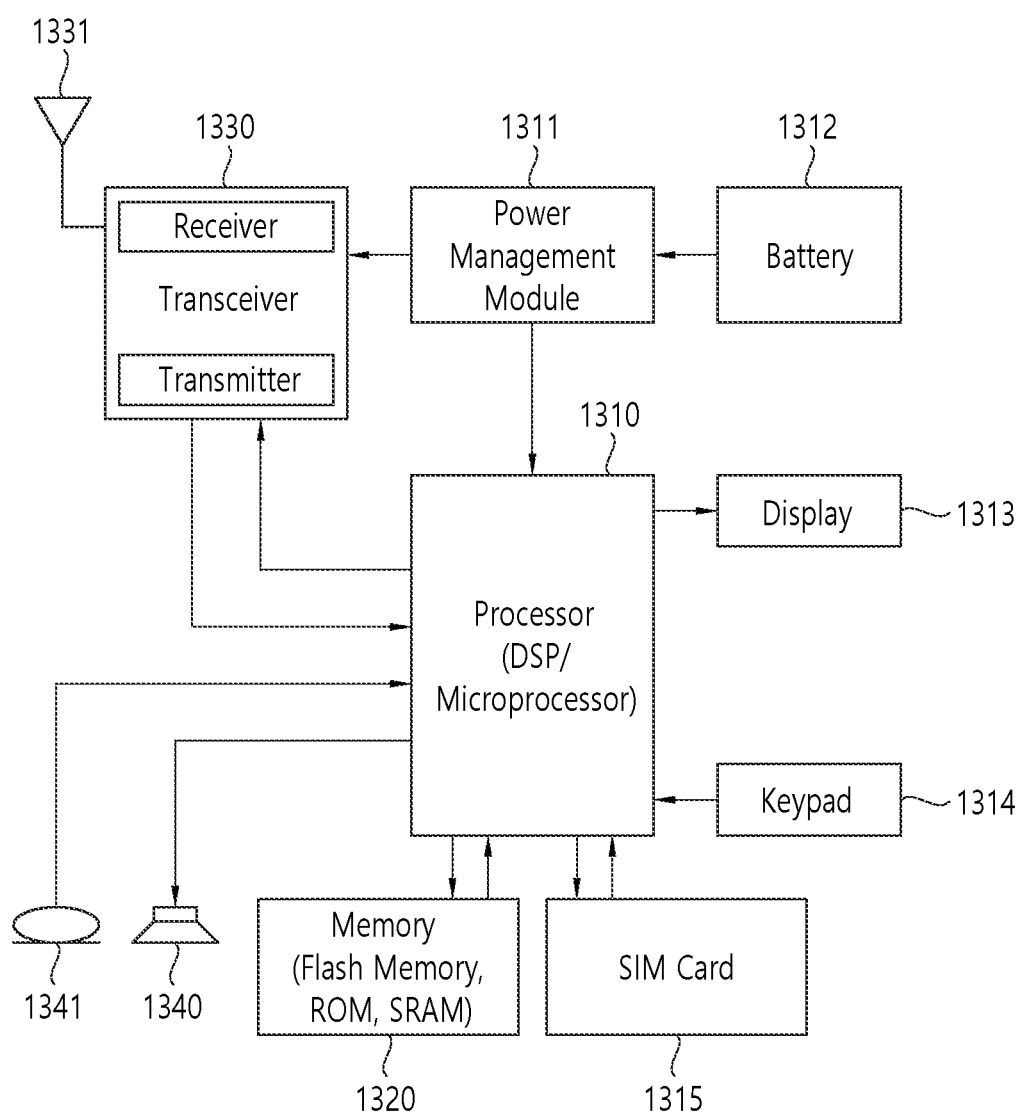
FIG. 13 shows a UE to implement an embodiment of the present disclosure.

FIG. 13 shows a UE to implement an embodiment of the present disclosure. The present disclosure described above for UE side may be applied to this embodiment.

A UE includes a processor 1310, a power management module 1311, a battery 1312, a display 1313, a keypad 1314, a subscriber identification module (SIM) card 1315, a memory 1320, a transceiver 1330, one or more antennas 1331, a speaker 1340, and a microphone 1341.

The processor 1310 may be configured to implement proposed functions, procedures and/or methods described in this description. Layers of the radio interface protocol may be implemented in the processor 1310. The processor 1310 may include application-specific integrated circuit (ASIC), other chipset, logic circuit and/or data processing device. The processor 1310 may be an application processor (AP). The processor 1310 may include at least one of a digital signal processor (DSP), a central processing unit (CPU), a graphics processing unit (GPU), a modem (modulator and demodulator). An example of the processor 1310 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1310 may be configured to, or configured to control the transceiver 1330 to, implement steps performed by the UE and/or the wireless device throughout the disclosure.

The power management module 1311 manages power for the processor 1310 and/or the transceiver 1330. The battery 1312 supplies power to the power management module 1311. The display 1313 outputs results processed by the processor 1310. The keypad 1314 receives inputs to be used by the processor 1310. The keypad 1314 may be shown on the display 1313. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1310 and stores a variety of information to operate the processor 1310. The memory 1320 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1310. The memory 1320 can be implemented within the processor 1310 or external to the processor 1310 in which case those can be communicatively coupled to the processor 1310 via various means as is known in the art.

The transceiver 1330 is operatively coupled with the processor 1310, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1310. The microphone 1341 receives sound-related inputs to be used by the processor 1310.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 14:
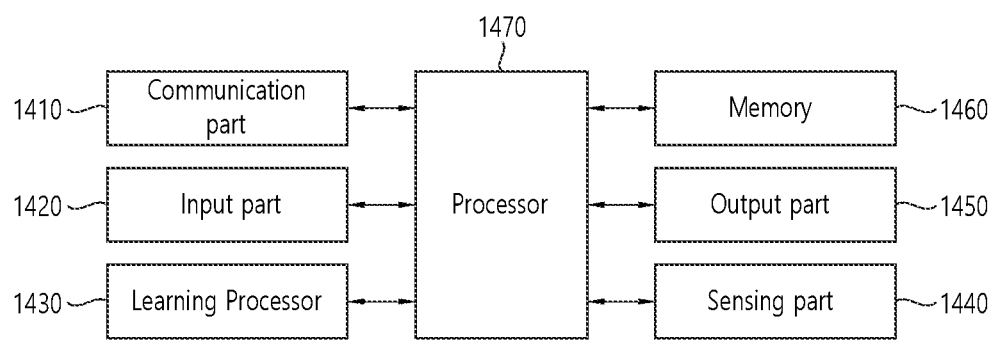
FIG. 14 shows an example of an AI device to which the technical features of the present disclosure can be applied.

FIG. 14 shows an example of an AI device to which the technical features of the present disclosure can be applied.

The AI device 1400 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 14, the AI device 1400 may include a communication part 1410, an input part 1420, a learning processor 1430, a sensing part 1440, an output part 1450, a memory 1460, and a processor 1470.

The communication part 1410 can transmit and/or receive data to and/or from external devices such as the AI devices and the AI server using wire and/or wireless communication technology. For example, the communication part 1410 can transmit and/or receive sensor information, a user input, a learning model, and a control signal with external devices. The communication technology used by the communication part 1410 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1420 can acquire various kinds of data. The input part 1420 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1420 can acquire input data to be used when acquiring an output using learning data and a learning model for model learning. The input part 1420 may obtain raw input data, in which case the processor 1470 or the learning processor 1430 may extract input features by preprocessing the input data.

The learning processor 1430 may learn a model composed of an ANN using learning data. The learned ANN can be referred to as a learning model. The learning model can be used to infer result values for new input data rather than learning data, and the inferred values can be used as a basis for determining which actions to perform. The learning processor 1430 may perform AI processing together with the learning processor of the AI server. The learning processor 1430 may include a memory integrated and/or implemented in the AI device 1400. Alternatively, the learning processor 1430 may be implemented using the memory 1460, an external memory directly coupled to the AI device 1400, and/or a memory maintained in an external device.

The sensing part 1440 may acquire at least one of internal information of the AI device 1400, environment information of the AI device 1400, and/or the user information using various sensors. The sensors included in the sensing part 1440 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1450 may generate an output related to visual, auditory, tactile, etc. The output part 1450 may include a display unit for outputting visual information, a speaker for outputting auditory information, and/or a haptic module for outputting tactile information.

The memory 1460 may store data that supports various functions of the AI device 1400. For example, the memory 1460 may store input data acquired by the input part 1420, learning data, a learning model, a learning history, etc.

The processor 1470 may determine at least one executable operation of the AI device 1400 based on information determined and/or generated using a data analysis algorithm and/or a machine learning algorithm. The processor 1470 may then control the components of the AI device 1400 to perform the determined operation. The processor 1470 may request, retrieve, receive, and/or utilize data in the learning processor 1430 and/or the memory 1460, and may control the components of the AI device 1400 to execute the predicted operation and/or the operation determined to be desirable among the at least one executable operation. The processor 1470 may generate a control signal for controlling the external device, and may transmit the generated control signal to the external device, when the external device needs to be linked to perform the determined operation. The processor 1470 may obtain the intention information for the user input and determine the user's requirements based on the obtained intention information. The processor 1470 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1430 and/or learned by the learning processor of the AI server, and/or learned by their distributed processing. The processor 1470 may collect history information including the operation contents of the AI device 1400 and/or the user's feedback on the operation, etc. The processor 1470 may store the collected history information in the memory 1460 and/or the learning processor 1430, and/or transmit to an external device such as the AI server. The collected history information can be used to update the learning model. The processor 1470 may control at least some of the components of AI device 1400 to drive an application program stored in memory 1460. Furthermore, the processor 1470 may operate two or more of the components included in the AI device 1400 in combination with each other for driving the application program.

Figure 15:
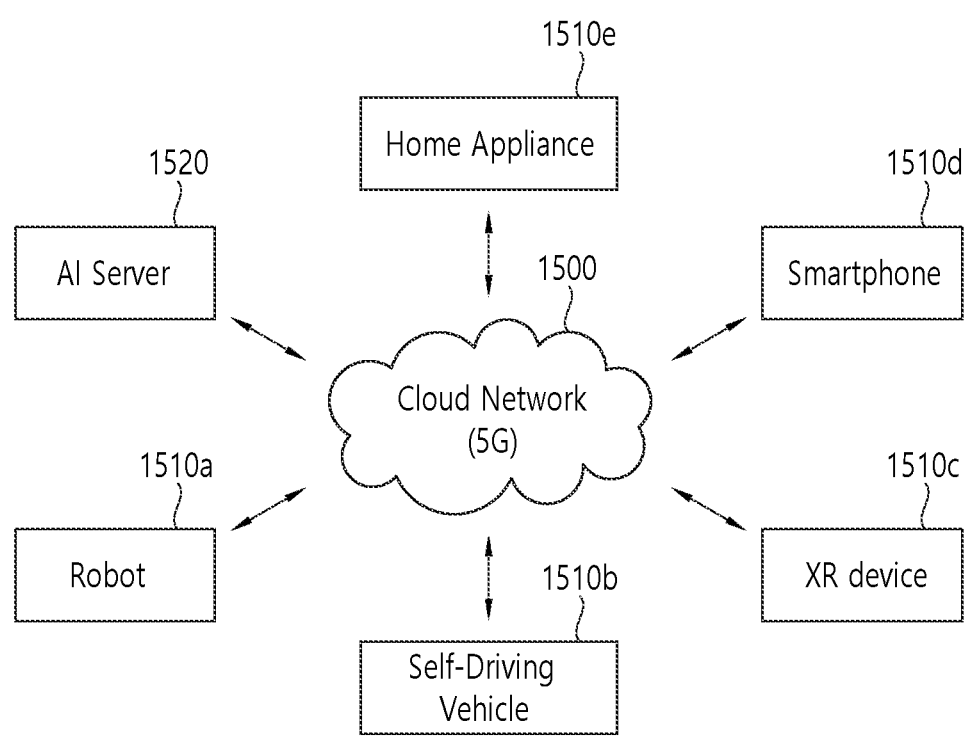
FIG. 15 shows an example of an AI system to which the technical features of the present disclosure can be applied.

FIG. 15 shows an example of an AI system to which the technical features of the present disclosure can be applied.

Referring to FIG. 15, in the AI system, at least one of an AI server 1520, a robot 1510*a*, an autonomous vehicle 1510*b*, an XR device 1510*c*, a smartphone 1510*d* and/or a home appliance 1510*e* is connected to a cloud network 1500. The robot 1510*a*, the autonomous vehicle 1510*b*, the XR device 1510*c*, the smartphone 1510*d*, and/or the home appliance 1510*e* to which the AI technology is applied may be referred to as AI devices 1510*a* to 1510*e*.

The cloud network 1500 may refer to a network that forms part of a cloud computing infrastructure and/or resides in a cloud computing infrastructure. The cloud network 1500 may be configured using a 3G network, a 4G or LTE network, and/or a 5G network. That is, each of the devices 1510*a* to 1510*e* and 1520 consisting the AI system may be connected to each other through the cloud network 1500. In particular, each of the devices 1510*a* to 1510*e* and 1520 may communicate with each other through a base station, but may directly communicate with each other without using a base station.

The AI server 1520 may include a server for performing AI processing and a server for performing operations on big data. The AI server 1520 is connected to at least one or more of AI devices constituting the AI system, i.e. the robot 1510*a*, the autonomous vehicle 1510*b*, the XR device 1510*c*, the smartphone 1510*d* and/or the home appliance 1510*e* through the cloud network 1500, and may assist at least some AI processing of the connected AI devices 1510*a* to 1510*e*. The AI server 1520 can learn the ANN according to the machine learning algorithm on behalf of the AI devices 1510*a* to 1510*e*, and can directly store the learning models and/or transmit them to the AI devices 1510*a* to 1510*e*. The AI server 1520 may receive the input data from the AI devices 1510*a* to 1510*e*, infer the result value with respect to the received input data using the learning model, generate a response and/or a control command based on the inferred result value, and transmit the generated data to the AI devices 1510*a* to 1510*e*. Alternatively, the AI devices 1510*a* to 1510*e* may directly infer a result value for the input data using a learning model, and generate a response and/or a control command based on the inferred result value.

Various embodiments of the AI devices 1510*a* to 1510*e* to which the technical features of the present disclosure can be applied will be described. The AI devices 1510*a* to 1510*e* shown in FIG. 15 can be seen as specific embodiments of the AI device 1400 shown in FIG. 14.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device configured to operate in a wireless communication system, the method comprising:
   performing an initial cell selection comprising:
      i) scanning all radio frequency (RF) channels in New Radio (NR) bands according to capabilities;
      ii) searching for a strongest cell on each frequency; and
      iii) selecting a suitable cell;
   performing cell reselection evaluation of non-serving cells for cell reselection;
   performing a cell reselection to a new serving cell from among the non-serving cells at a first time point during a time duration;
   receiving cell reselection parameters comprising speed dependent reselection parameters in system information from the new serving cell; and
   determining a mobility state of the wireless device based on the cell reselection parameters,
   wherein the cell reselection parameters further comprise information about a first time range and a weight related to the first time range, and
   wherein determining the mobility state of the wireless device comprises:
      i) calculating a time interval between the first time point and a second time point at which a preceding cell reselection of the cell reselection is performed during the time duration; and
      ii) increasing a mobility counter by a number N,
   wherein the number N is set to the weight related to the first time range based on the time interval being within the first time range, and
   wherein the number N is set to 1 based on the time interval not being within the first time range.

2. The method of claim 1, wherein the cell reselection parameters comprise a plurality of time ranges and a plurality of weights each of which is related to each of the plurality of time ranges.

3. The method of claim 2, further comprising:
   determining, among the plurality of time ranges, the first time range to which the calculated time interval belongs; and
   identifying the weight related to the first time range.

4. The method of claim 2, wherein a weight related to a highest time range among the plurality of time ranges is 1.

5. The method of claim 1, wherein the time duration comprises a duration for evaluating allowed amount of the mobility counter.

6. The method of claim 1, wherein the mobility state is determined to be a normal mobility state based on a final mobility counter for the time duration being less that a first threshold,
   wherein the mobility state is determined to be a medium mobility state based on the final mobility counter for the time duration being greater than or equal to the first threshold and less than a second threshold, and
   wherein the mobility state is determined to be a high mobility state based on the final mobility counter being greater than or equal to the second threshold.

7. The method of claim 1, further comprising:
   determining a hysteresis value for cell reselection ranking criterion and a cell reselection timer value based on the mobility state of the wireless device; and
   performing a next cell reselection to another cell based on the hysteresis value and the cell reselection timer value.

8. The method of claim 7, wherein the determining of the hysteresis value and the cell reselection timer value comprises identifying the hysteresis value and the cell reselection timer value based on the mobility state of the wireless device being determined to be a normal mobility state.

9. The method of claim 7, wherein the determining of the hysteresis value and the cell reselection timer value comprises adjusting the hysteresis value and the cell reselection timer value based on the mobility state of the wireless device being determined to be a medium mobility state or a high mobility state.

10. The method of claim 1, further comprising:
    performing a next cell reselection to another cell at a third time point during the time duration;
    receiving, from the another cell, information comprising a plurality of time ranges and a plurality of weights each of which is related to each of the plurality of time ranges;
    determining, among the plurality of time ranges, a second time range to which a time interval between the third time point and the first time point belongs; and
    increasing the mobility counter by a weight related to the second time range,
    wherein the second time range is different from the first time range, and
    wherein the weight related to the second time range is different from the weight related to the first time range.

11. The method of claim 10, wherein the second time range is higher than the first time range, and
    wherein the weight related to the second time range is smaller than the weight related to the first time range.

12. The method of claim 1, wherein the wireless device is in communication with at least one of a mobile device, a network, or autonomous vehicles other than the wireless device.

13. The method of claim 1, further comprising:
    performing a next cell reselection to another cell at a third time point during the time duration;
    receiving, from the another cell, information comprising a plurality of time ranges and a plurality of weights each of which is related to each of the plurality of time ranges; and
    increasing the mobility counter by 1 based on a time interval between the third time point and the first time point belonging to none of the plurality of time ranges.

14. A wireless device configured to operate in a wireless communication system, the wireless device comprising:
    a memory;
    a transceiver; and
    at least one processor, operatively coupled to the memory and the transceiver, configured to:
    perform an initial cell selection comprising:
       i) scanning all radio frequency (RF) channels in New Radio (NR) bands according to capabilities;
       ii) searching for a strongest cell on each frequency; and
       iii) selecting a suitable cell;

perform cell reselection evaluation of non-serving cells for cell reselection;
perform a cell reselection to a new serving cell from among the non-serving cells at a first time point during a time duration,
receive cell reselection parameters comprising speed dependent reselection parameters in system information from the new serving cell; and
determine a mobility state of the wireless device based on the cell reselection parameters,
wherein the cell reselection parameters further comprise information about a first time range and a weight related to the first time range, and
wherein determining the mobility state of the wireless device comprises:
  i) calculating a time interval between the first time point and a second time point at which a preceding cell reselection of the cell reselection is performed during the time duration; and
  ii) increasing a mobility counter by a number N,
wherein the number N is set to the weight related to the first time range, and
wherein the number N is set to 1 based on the time interval not being within the first time range.

* * * * *